US008930547B2

(12) United States Patent
Mukkara et al.

(10) Patent No.: US 8,930,547 B2
(45) Date of Patent: Jan. 6, 2015

(54) TECHNIQUES FOR ACHIEVING STORAGE AND NETWORK ISOLATION IN A CLOUD STORAGE ENVIRONMENT

(75) Inventors: Umasankar Mukkara, Bangalore (IN); Felix Xavier, Bangalore (IN)

(73) Assignee: CloudByte, Inc., San Mateo, CA (US)

( * ) Notice: Subject to any disclaimer, the term of this patent is extended or adjusted under 35 U.S.C. 154(b) by 269 days.

(21) Appl. No.: 13/598,048

(22) Filed: Aug. 29, 2012

(65) Prior Publication Data

US 2013/0067540 A1  Mar. 14, 2013

(30) Foreign Application Priority Data

Sep. 14, 2011  (IN) ............................. 3160/CHE/2011

(51) Int. Cl.
*G06F 15/16* (2006.01)
*G06F 21/00* (2013.01)
*H04L 29/08* (2006.01)
*G06F 3/06* (2006.01)

(52) U.S. Cl.
CPC ............ *H04L 67/1097* (2013.01); *H04L 69/32* (2013.01); *G06F 3/0635* (2013.01)
USPC ........... 709/227; 709/226; 709/228; 709/229; 710/72; 710/74; 711/112; 711/152; 711/217

(58) Field of Classification Search
CPC .................................. G06F 21/00; G06F 15/16
USPC .............................................. 726/5; 713/153
See application file for complete search history.

(56) References Cited

U.S. PATENT DOCUMENTS

| 8,578,076 | B2 * | 11/2013 | van der Linden et al. ...... 710/72 |
| 8,601,473 | B1 * | 12/2013 | Aron et al. ......................... 718/1 |
| 2009/0288084 | A1 * | 11/2009 | Astete et al. ..................... 718/1 |
| 2012/0131341 | A1 * | 5/2012 | Mane et al. .................... 713/168 |
| 2012/0297183 | A1 * | 11/2012 | Mukkara et al. ............... 713/153 |

OTHER PUBLICATIONS

"Implementing, Serving, and Using Cloud Storage"—SNIA, Oct. 2010 http://www.snia.org/sites/default/files/2010-10-WP-ImplementingServingandUsingTheCloud.pdf.*

* cited by examiner

*Primary Examiner* — Randy Scott
(74) *Attorney, Agent, or Firm* — Schwegman Lundberg & Woessner, P.A.

(57) ABSTRACT

Techniques for achieving storage and network isolation in a cloud environment are presented. A single Internet Protocol (IP) address is presented to multiple storage tenants that use storage in a cloud environment. When each tenant accesses the IP address, a specific identity of the tenant is resolved and the storage stack for that tenant is sent to the tenant's storage machine having the tenant's storage. The tenant is directly connected to its tenant storage machine thereafter.

17 Claims, 5 Drawing Sheets ial Patent Application No. 3160/CHE/2011 entitled: "Architecture and Method to Achieve Storage and Network Isolation in Cloud Storage Environment," filed with the Indian Patent Office on Sep. 14, 2011, the disclosure of which is incorporated by reference herein in its entirety.

BACKGROUND

Cloud computing is rapidly changing the Internet into a collection of clouds, which provide a variety of computing resources, storage resources, and, in the future, a variety of resources that are currently unimagined.

Specifically, cloud computing is a technology infrastructure that facilitates: supplementing, consuming, and delivering Information Technology (IT) services. The cloud environment provides elastic provisioning of dynamically scalable virtual services.

A tenant is considered as a subscriber of some amount of storage in the cloud or an application who owns part of the shared storage environment. Multi-tenancy is an architecture where a single instance of software runs on a server, which is serving multiple tenants. In a multi-tenant environment, all tenants and their users consume the service from a same technology platform, sharing all components in the technology stack including the data model, servers, and database layers. Further, in a multi-tenant architecture, the data and configuration is virtually partitioned and each tenant works with a customized virtual application instance.

One challenge in achieving multi-tenancy in a cloud storage environment is to provide an isolated networking stack on a per-tenant basis. This is so because the storage controller shares the operating system resources for all the tenants that are resident in the multi-tenant architecture. To correct this, traditional multi-tenant architectures will dedicate a unique Internet Protocol (IP) address for accessing the multi-tenant architecture on a per-tenant basis.

Yet, current multi-tenancy approaches to storage are monolithic in nature. The storage stack as well as the networking stack is shared among all tenants and each tenant is associated with a unique IP address that a storage protocol stack directly listens on. Moreover, the approaches do not permit for movement of the storage stack from one IP address to another IP address without disrupting an existing tenant to storage connection.

Today, clients access multi-tenant environments through storage service end points using Network File System (NFS), Common Internet File System (CIFS) and Internet Small Computer System Interface (iSCSI). Once a client makes a connection to a corresponding storage protocol stack on the storage controller, the connection is rigid. So, if a tenant needs to be moved to a different storage controller, the connection with the client is broken.

SUMMARY

Various embodiments of the invention provide techniques for achieving storage and network isolation in a cloud environment. Specifically, and in one embodiment a method for tenant storage isolation in a cloud environment is presented. More particularly and in an embodiment, a request is received for access to a portion of shared storage that is situated in a cloud environment. The request originates from a tenant and the storage services multiple other tenants from the cloud environment. A tenant identifier is identified for the tenant and a tenant storage machine (TSM) uniquely assigned to the tenant. Finally, the tenant is transitioned to the tenant storage machine for a storage connection session.

DETAILED DESCRIPTION

A "resource" includes a user, service, system, device, directory, data store, groups of users, a file, a file system, combinations and/or collections of these things, etc. A "principal" is a specific type of resource, such as an automated service or user that acquires an identity. As used herein a "principal" may be used synonymously and interchangeably with the term "tenant."

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "cloud environment," and the term "cloud" may be used interchangeably and synonymously herein.

Moreover, it is noted that a "cloud" refers to a logical and/or physical processing environment as discussed above.

The techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

It is within this context that embodiments of the invention are now discussed within the context of the FIGS. 1-5.

Figure 1:
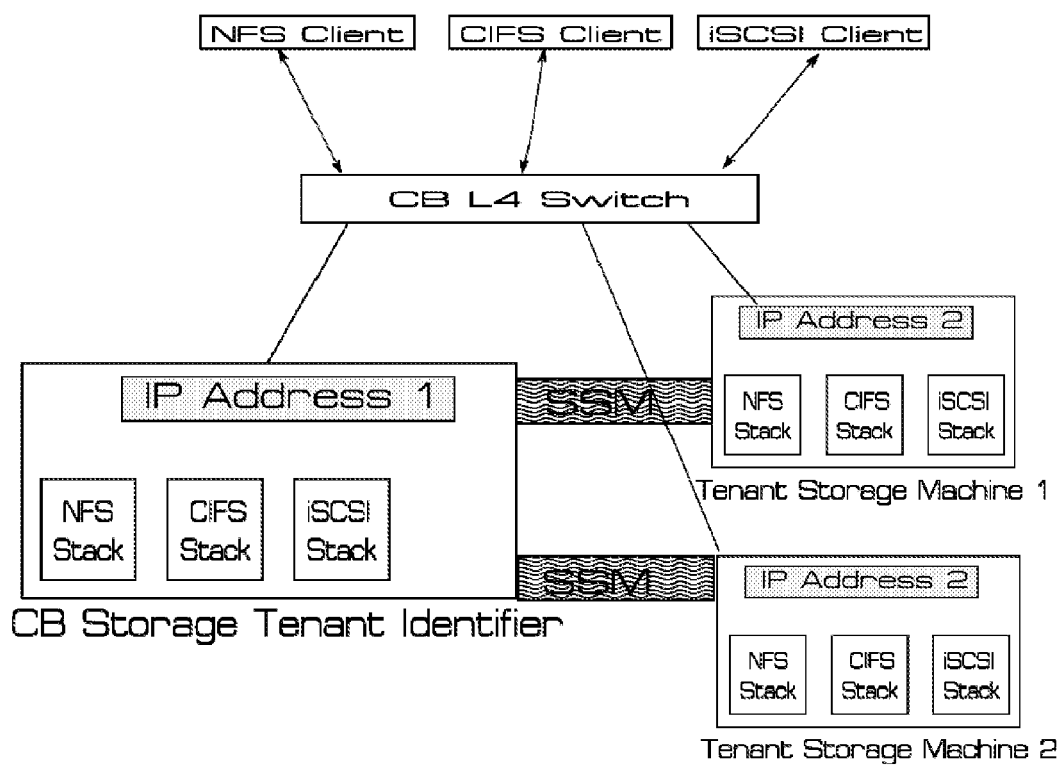
FIG. 1 is a diagram depicting an architecture for a cloud storage environment capable of providing storage and network isolation on a per tenant basis, according to the techniques presented herein.

FIG. 1 is a diagram depicting an architecture for a cloud storage environment capable of providing storage and network isolation on a per tenant basis, according to the techniques presented herein. It is noted that the architecture is presented as one example embodiment as other arrangements and elements are possible without departing from the teachings presented herein.

The architecture of the FIG. 1 shows a custom Layer-4 network switch, storage controllers (alternatively referred to as Storage Tenant Identifier), a plurality of client machines including but not limited to NFS client machine, CIFS client machine, and iSCSI client machine, and a plurality of tenant storage machines (TSM). The architecture may also comprise other tenants (not illustrated in the FIG. 1) who use the storage as a service through the client machines. A new connection from a particular client is always switched to the Storage Tenant Identifier. Once the protocol specific authentication is completed, it is possible to identify the tenant to which the client belongs. At that point in time, the connection table in the switch is modified so that the connection request from the particular client is switched to the corresponding Tenant Storage Machine (TSM). The process of moving the storage stack from Storage Tenant identifier to TSM is called Storage Stack Movement (SSM). The SSM involves modifying the connection tables at the L4 switch as well as moving the connection state information of the protocol stack from Main Storage Controller to the corresponding TSM. The present invention solves the problem of providing networking isolation to the storage multi-tenancy by prescribing the TSM-SSM architecture and through the details of SSM.

As described in the FIG. 1, the architecture for dynamic storage movement consists of a custom Layer 4 switch and storage controllers. A fresh new connection from a particular client is always switched to the Storage Tenant Identifier. Once the protocol specific authentication is completed, it is possible to identify the tenant to which the client belongs. At that point of time, the connection table is modified so that the connection is switched to the corresponding Tenant-storage-machine or TSM. The process of moving the storage stack from Storage Tenant Identifier to TSM is called Storage Stack Movement (or SSM). The SSM involves modifying the connection tables at the L4 switch as well as moving the connection state information of the protocol stack from Main Storage Controller to the corresponding TSM. The techniques herein solve the problem of providing networking isolation to the storage multi-tenancy by prescribing the TSM-SSM architecture and though the details of SSM.

Figure 2:
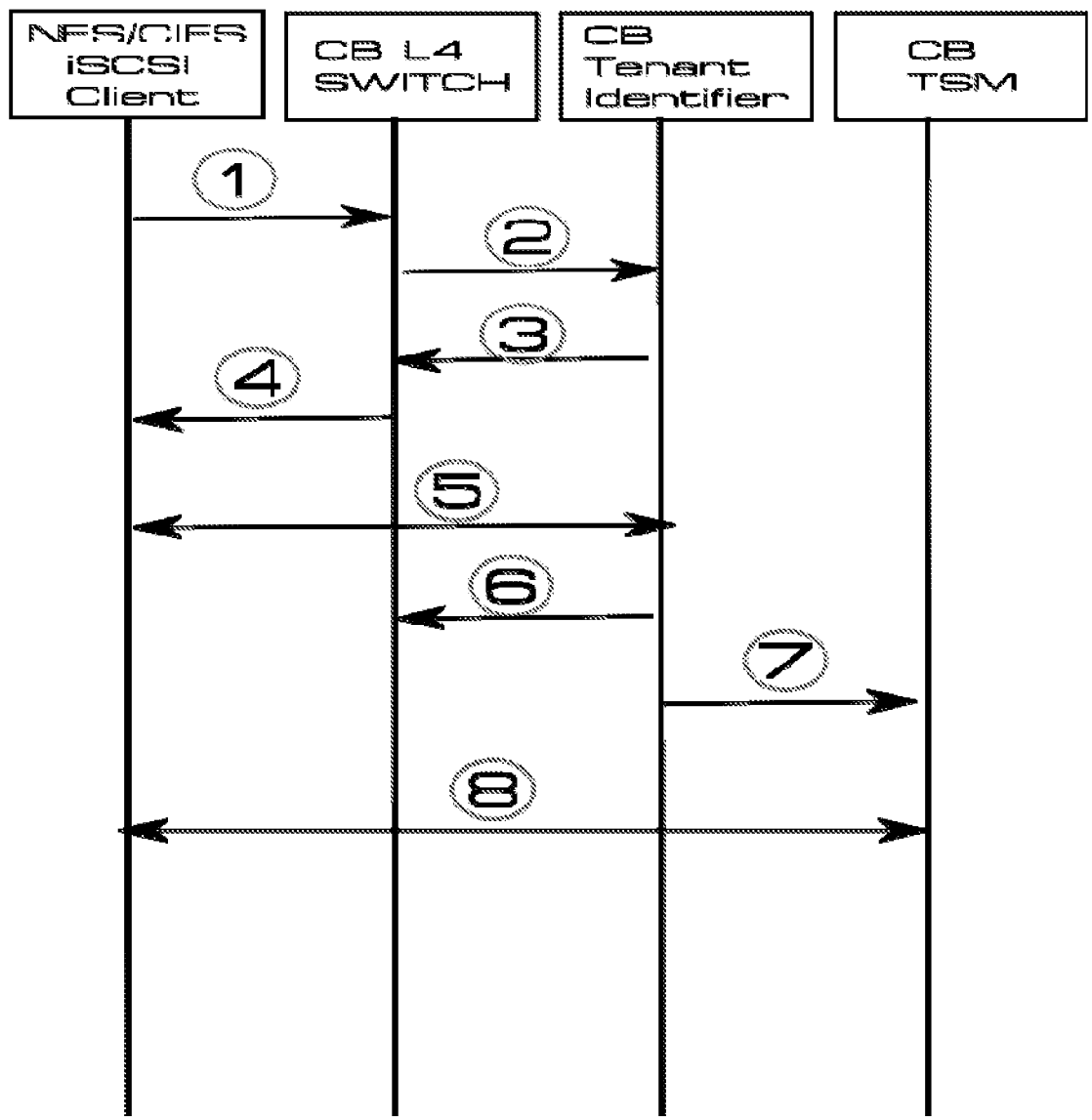
FIG. 2 is a diagram depicting a sequence of processing for achieving tenant isolation in a multi-tenant storage environment within a cloud environment, according to embodiments presented herein.

FIG. 2 is a diagram depicting a sequence of processing for achieving tenant isolation in a multi-tenant storage environment within a cloud environment, according to embodiments presented herein.

At 1, the storage client makes a connection at a given IP address (IP1). IP1 is being listened to by the custom L4 switch. It can be either an independent machine or a software module.

At 2, the L4 switch recognizes that this is a new connection from the client and switches it to the default back end storage server, which is the Tenant Identifier.

At 3 and 4, the authentication procedure and initial connection establishment happens in step 3 and 4

At 5, this may take multiple iterations of messages over the same connections. At the end of step 5, the storage protocol authentication is completed. It can be an NFS, a CIFS, or an iSCSI connection. Once the authentication is completed, the tenant identifier identifies the tenant to which the client belongs. Now the Tenant identifier starts the Storage Stack Movement (SSM).

At 6, the CB Tenant identifier sends a specific message to alter the TCP connection mapping so that any new connection from the client to the custom L4 switch is switched to the TSM1 rather than to the tenant identifier.

At 7, in parallel to 6, the tenant identifier sends a message to the TSM1. The message includes all the storage stack state information for the client.

At 8, when the client makes a new connection, the connection is switched to TSM1, which will have all the storage stack state to process the storage request.

The architecture of the FIG. 1 and the processing depicted in the sequencing of the FIG. 2 demonstrate how a multi-tenant cloud environment can be accessed via a single IP address and provide separate storage stacks to each tenant. Moreover, existing storage machines for a single tenant can be expanded without altering access via the single IP address for that tenant.

Figure 3:
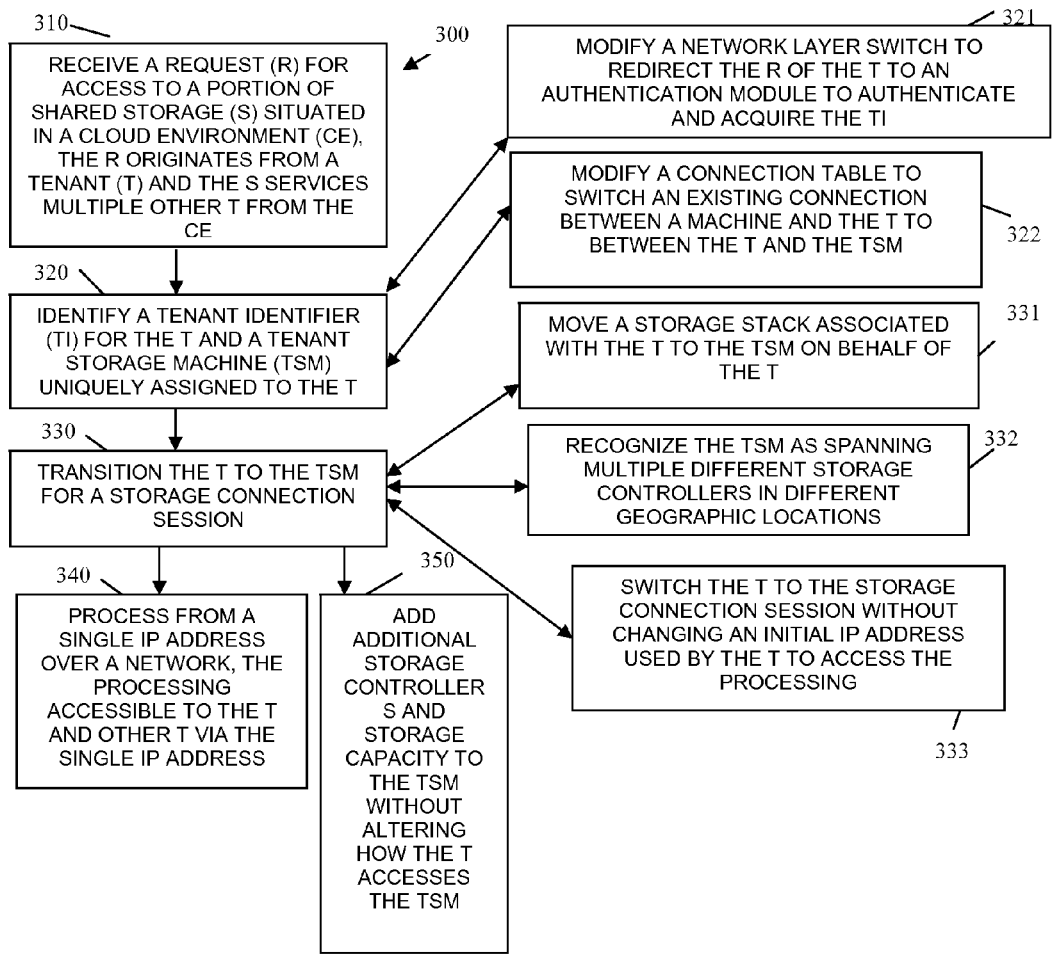
FIG. 3 is a diagram of a method for providing tenant storage isolation, according to embodiments presented herein.

FIG. 3 is a diagram of a method 300 for providing tenant storage isolation, according to embodiments presented herein. The method 300 (herein referred to as "tenant storage machine (TSM) controller service") is implemented, programmed, and resides within a non-transitory machine-readable storage medium that executes on one or more processors of a network. The network may be wired, wireless, or a combination of wired and wireless.

At 310, the TSM controller service receives a request for access to a portion of shared storage situated in a cloud environment. The request originates from a tenant and the shared storage services multiple other tenants.

At 320, the TSM controller service identifies a tenant identifier for the tenant and a tenant storage machine uniquely assigned to the tenant. The tenant storage machine may comprise multiple storage controllers that are geographically dispersed. Each tenant has its own tenant storage machine logically assigned within the shared storage of the cloud environment.

According to an embodiment, at 321, the TSM controller service modifies a network layer switch (such as L4 for TCP network stack) to redirect the request for the tenant to an authentication module to authenticate and acquire the tenant identifier for the tenant.

In an embodiment, at 322, the TSM controller service modifies a connection table to switch an existing connection between the machine of the TSM controller service and the tenant to between the tenant and the tenant storage machine.

At 330, the TSM controller service transitions the tenant to the tenant storage machine for a storage connection session. In other words, the tenant is connected in a communication session with the tenant storage machine.

In an embodiment, at 331, the TSM controller service moves a storage stack associated with the tenant to the tenant storage machine on behalf of the tenant.

In another case, at 332, the TSM controller service recognizes the tenant storage machine as spanning multiple different storage controllers in different geographic locations (as discussed above).

In yet another situation, at 333, the TSM controller service switches the tenant to the storage connection session without changing an initial IP address used by the tenant to access the TSM controller service.

According to an embodiment, at 340, the TSM controller service processes from a single IP address over a network. The TSM controller service is accessible to the tenant and the other tenants via the single IP address over the network.

In another case, at 350, the TSM controller service adds additional storage controllers and storage capacity to the tenant storage machine without altering how the tenant accesses the tenant storage machine.

Figure 4:
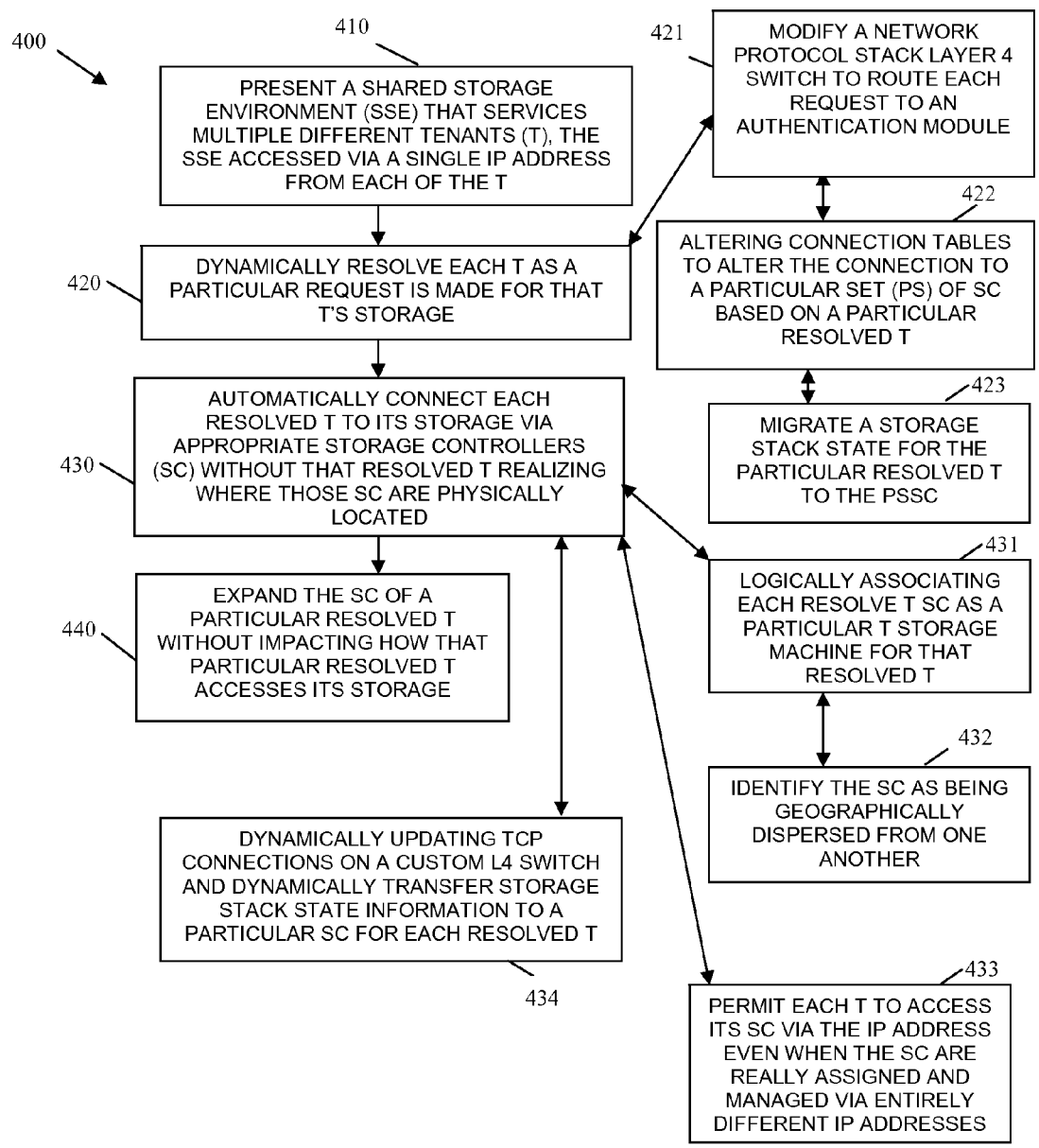
FIG. 4 is a diagram of another method for tenant storage isolation in a cloud storage environment, according to embodiments presented herein.

FIG. 4 is a diagram of another method 400 for tenant storage isolation in a cloud storage environment, according to embodiments presented herein. The method 400 (herein referred to as "tenant storage isolation controller") is implemented, programmed, and resides within a non-transitory machine-readable storage medium that executes on one or more processors of a network. The network may be wired, wireless, or a combination of wired and wireless.

At 410, the tenant storage isolation controller presents a shared storage environment that services multiple different tenants. The shared storage environment accessed via a single IP address from each of the tenants.

At 420, the tenant storage isolation controller dynamically resolves each tenant as a particular request is made for that tenant's storage.

According to an embodiment, at 421, the tenant storage isolation controller modifies a network protocol stack layer 4 (L4) switch to route each request to an authentication module.

Continuing with the embodiment of 421 and at 422, the tenant storage isolation controller alters connection tables to alter the connection to a particular set of storage controllers based on a particular resolved tenant.

Continuing with the embodiment of 422 and at 423, the tenant storage isolation controller migrates a storage stack state for the particular resolved tenant to the particular set of storage controllers.

At 430, the tenant storage isolation controller automatically connects each resolved tenant to its storage via appropriate storage controllers without that resolved tenant realizing where those storage controllers are physically located.

In an embodiment, at 431, the tenant storage isolation controller logically associates each resolved tenant's storage controllers as a particular tenant's storage machine for that resolved tenant.

Continuing with the embodiment of 431 and at 432, the tenant storage isolation controller identifies the storage controllers as being geographically dispersed from one another.

In one situation, at 433, the tenant storage isolation controller permits each tenant to access its storage controllers via the IP address even when the storage controllers are really assigned and managed via entirely different IP addresses.

In yet another case, at 434, the tenant storage isolation controller dynamically updating TCP connections on a custom L4 switch and dynamically transfer storage stack state information to a particular storage controllers for each resolved tenant.

According to an embodiment, at 440, the tenant storage isolation controller expands the storage controllers of a particular resolved tenant without impacting how that particular resolved tenant accesses its storage.

Figure 5:
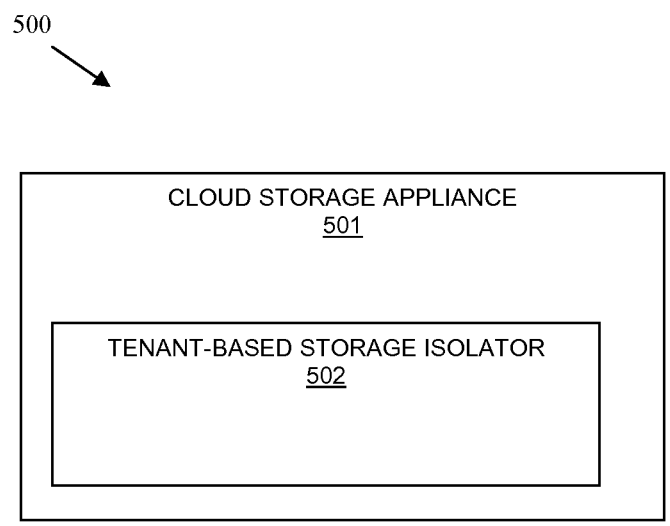
FIG. 5 is a diagram of a tenant storage isolation system, according to embodiments presented herein.

FIG. 5 is a diagram of a tenant storage isolation system 500, according to embodiments presented herein. The components of the tenant storage isolation system 500 are implemented, programmed, and reside within a non-transitory machine-readable storage medium that executes on one or more processors of a network. The network may be wired, wireless, or a combination of wired and wireless.

In an embodiment, the tenant storage isolation system 500 implements, inter alia, the processing associated with the methods 300 and 400 of the FIGS. 3 and 4, respectively using the architectures provided by the FIG. 1 and the processing discussed with the FIG. 2.

The tenant storage isolation system 500 includes a cloud storage appliance 501 and a tenant-based storage isolator 502. Each of these and their interactions with one another will now be discussed in turn.

The cloud storage appliance 501 has one or more processors, memory, and storage. The cloud storage appliance 501 situated in a cloud environment and accessed over a network via a single IP address.

The memory of the cloud storage appliance 501 configured with the tenant-based storage isolator 502 implemented as executable instructions that process on the one or more processors of the cloud storage applicant 501. Example processing associated with the tenant-based storage isolator 502 was presented above with reference to the FIGS. 1-4.

The tenant-based storage isolator 502 is configured to dynamically authenticate particular tenants accessing the cloud storage via the single IP address and dynamically transition each tenant to its independent and isolated storage managed by its storage controllers.

According to an embodiment, the tenant-based storage isolator 502 is configured to dynamically modify TCP connections for each tenant.

In another case, the tenant-based storage isolator 502 is also configured to dynamically add new storage controllers for a given tenant without altering how that given tenant accesses its storage via the cloud storage environment using the single IP address.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors of a machine configured to perform the method, comprising:
   receiving, at the machine, a request for access to a portion of shared storage situated in a cloud environment, the request originates from a tenant and the storage services multiple other tenants from the cloud environment;
   identifying, on the machine, a tenant identifier for the tenant and a tenant storage machine (TSM) uniquely assigned to the tenant; and
   transitioning, from the machine, the tenant to the tenant storage machine for a storage connection session and switching the tenant to the storage connection session without changing an initial Internet Protocol (IP) address used by the tenant to access the method.

2. The method of claim 1 further comprising, processing the method from a single Internet Protocol (IP) address over a network, the method accessible to the tenant and the other tenants via the single IP address.

3. The method of claim 1 further comprising, adding, by the machine, additional storage controllers and storage capacity to the tenant storage machine without altering how the tenant accesses the tenant storage machine.

4. The method of claim 1, wherein identifying further includes modifying a network layer switch to redirect the request of the tenant on the machine to an authentication module to authenticate and acquire the tenant identifier.

5. The method of claim 1, wherein identifying further includes modifying a connection table to switch an existing connection between the machine and the tenant to between the tenant and the tenant storage machine.

6. The method of claim 1, wherein transitioning further includes moving a storage stack associated with the tenant to the tenant storage machine on behalf of the tenant.

7. The method of claim 1, wherein transitioning further includes recognizing the tenant storage machine as spanning multiple different storage controllers in different geographical locations.

8. A method implemented in a non-transitory machine-readable storage medium and processed by one or more processors of a machine configured to perform the method, comprising.
- presenting, on the machine, a shared storage environment that services multiple different tenants, the shared storage environment accessed via a single Internet Protocol (IP) address from each of the tenants;
- dynamically resolving, on the machine, each tenant as a particular request is made for that tenant's storage; and
- automatically connecting, via the machine, each resolved tenant to its storage via appropriate storage controllers without that resolved tenant realizing where those storage controllers are physically located, and permitting each tenant to access its storage controllers via the IP address even when the storage controllers are really assigned and managed via entirely different IP addresses.

9. The method of claim 8 further comprising, expanding the storage controllers of a particular resolved tenant without impacting how that particular resolved tenant accesses its storage.

10. The method of claim 8, wherein dynamically resolving further includes modifying a network protocol stack layer 4 switch to route each request to an authentication module.

11. The method of claim 10, wherein modifying further includes altering connection tables to alter the connection to a particular set of storage controllers based on a particular resolved tenant.

12. The method of claim 11, wherein altering further includes migrating a storage stack state for the particular resolved tenant to the particular set of storage controllers.

13. The method of claim 8, wherein automatically connecting further includes logically associating each resolved tenant's storage controllers as a particular tenant storage machine for that resolved tenant.

14. The method of claim 13, wherein logically associating further includes identifying the storage controllers as being geographically dispersed from one another.

15. The method of claim 8, wherein automatically connecting further includes dynamically updating Transmission Control Protocol (TCP) connections on a custom L4 switch and dynamically transferring storage stack state information to particular storage controllers for each resolved tenant.

16. A system, comprising:
- a cloud storage appliance having one or more hardware processors, memory, and storage, the cloud storage appliance situated in a cloud environment and accessed over a network via a single Internet Protocol (IP) address; and
- the memory configured with a tenant-based storage isolator implemented as executable instructions that process on the one or more hardware processors of the storage appliance;
- wherein the tenant-based storage isolator is configured to dynamically authenticate particular tenants accessing the cloud storage via the IP address and dynamically transition each tenant to its independent and isolated storage managed by its storage controllers, and wherein the tenant-based storage isolator is configured to dynamically add new storage controllers for a given tenant without altering how that given tenant accesses its storage via the cloud storage environment using the single IP address.

17. The system of claim 16, wherein the tenant-based storage isolator is configured to dynamically modify Transmission Control Protocol (TCP) connections for each tenant.

* * * * *

UNITED STATES PATENT AND TRADEMARK OFFICE
CERTIFICATE OF CORRECTION

PATENT NO. : 8,930,547 B2
APPLICATION NO. : 13/598048
DATED : January 6, 2015
INVENTOR(S) : Mukkara et al.

It is certified that error appears in the above-identified patent and that said Letters Patent is hereby corrected as shown below:

In the Claims

In column 7, line 3-4, in Claim 8, delete "comprising." and insert --comprising:--, therefor Signed and Sealed this
Eleventh Day of August, 2015

Michelle K. Lee
*Director of the United States Patent and Trademark Office*